April 26, 1960

C. H. MacINTYRE 2,934,288

CONTROL SYSTEM FOR VARYING AIRFOIL SURFACES AND THE AIR
INLET TO THE ENGINE OF AN AIRCRAFT UNDER
PREVAILING OPERATING CONDITIONS

Filed Dec. 15, 1954

INVENTOR.
CHARLES H. MacINTYRE
BY *Herbert L. Davis*

ATTORNEY

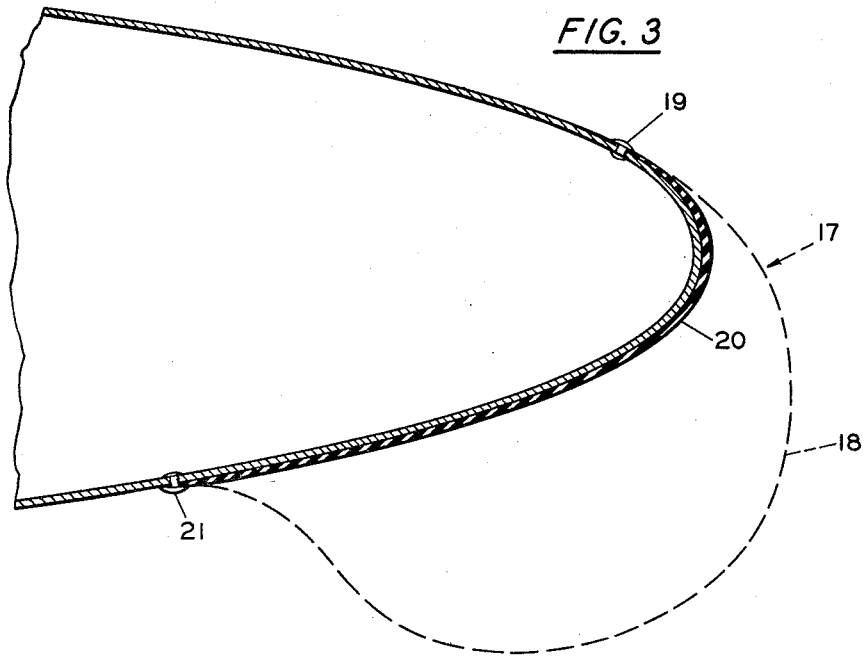
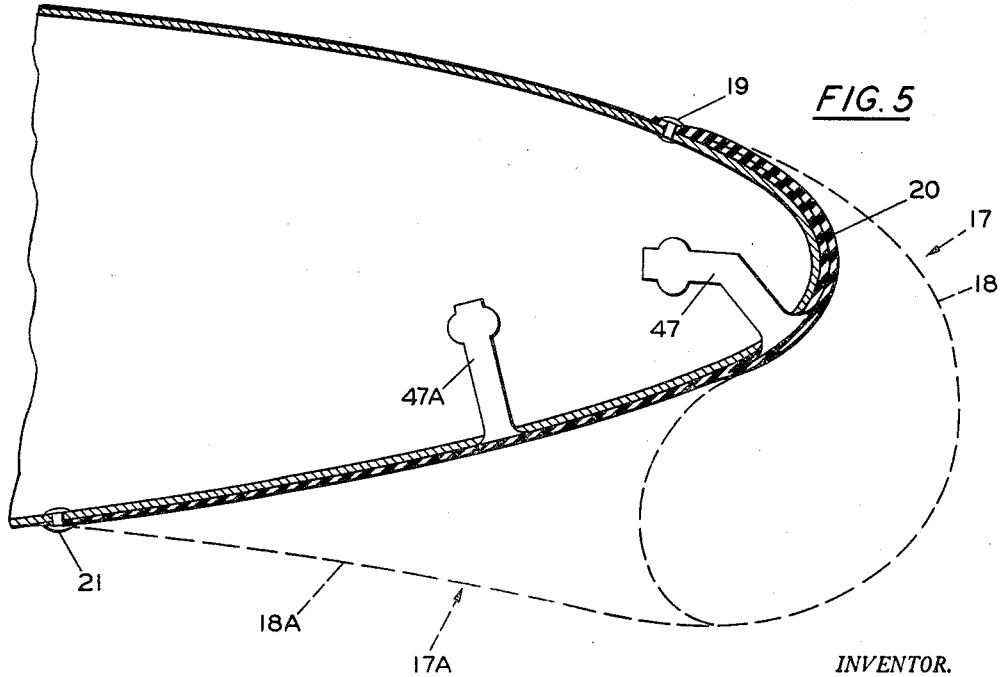

INVENTOR.
CHARLES H. MacINTYRE
BY Herbert L Davis
ATTORNEY

# United States Patent Office 2,934,288
Patented Apr. 26, 1960

2,934,288

CONTROL SYSTEM FOR VARYING AIRFOIL SURFACES AND THE AIR INLET TO THE ENGINE OF AN AIRCRAFT UNDER PREVAILING OPERATING CONDITIONS

Charles Hale MacIntyre, Paramus, N.J., assignor to Bendix Aviation Corporation, Teterboro, N.J., a corporation of Delaware Application December 15, 1954, Serial No. 475,398

9 Claims. (Cl. 244—44)

The present application relates to novel control systems and devices for accomplishing the inflation and deflation of inflatable shoes or boots to vary the contour of the wing leading edge of an aircraft or projectile through the operation of novel electrical and mechanical equipment and to vary the contour and opening of an air inlet duct to an aircraft engine under varying operating conditions of flight of the aircraft.

An object of the present invention is to automatically effect the inflation and deflation of inflatable shoes or boots mounted along the leading edge of the wing of an aircraft and at the underside of the wing or airfoil so as to extend and retract a blister-like covering at given speeds or altitudes sensed by a Mach switch, air speed responsive switch, altitude responsive switch, or the like controlling suitable mechanism to automatically cause the inflation and deflation of the blister-like covering at the given Mach number, speed or altitude of the aircraft. Thus when the extra lift caused by inflation of such blister-like covering on the underside of the wing of the aircraft is no longer necessary at the prevailing high speeds or altitudes of the aircraft and at which speeds or altitudes the inflated blisterlike covering becomes an unnecessary drag on the aircraft the same may be automatically deflated.

Another object of the present invention is to provide inflatable boots or shoes around the inlet duct to an aircraft engine so as to change the contour of the inlet duct by the inflation and deflation of such boots or shoes and permit the inlet duct to supply air to the engine to provide better performance of the aircraft at relatively low air speeds and/or altitude conditions and to affect means to deflate such boots at higher speeds and/or altitudes so as to provide a maximum air inlet to the aircraft engines under maximum air speed and altitudes operating conditions.

Another object of the invention is to provide novel control means for accomplishing inflation and deflation of the inflatable shoes or boots carried on the leading edge of the wing and engine inlet of an aircraft so as jointly to control engine air supply and to change the contour of the wing and the inlet of the aircraft and permit the aircraft to take off at lower speeds and from shorter runways and also for landing the aircraft at lesser speeds and on shorter runways.

The above and other objects and features of the invention will appear more fully hereinafter from a consideration of the following description taken with the accompanying drawings wherein several embodiments of the invention are shown by way of example.

Figure 1:
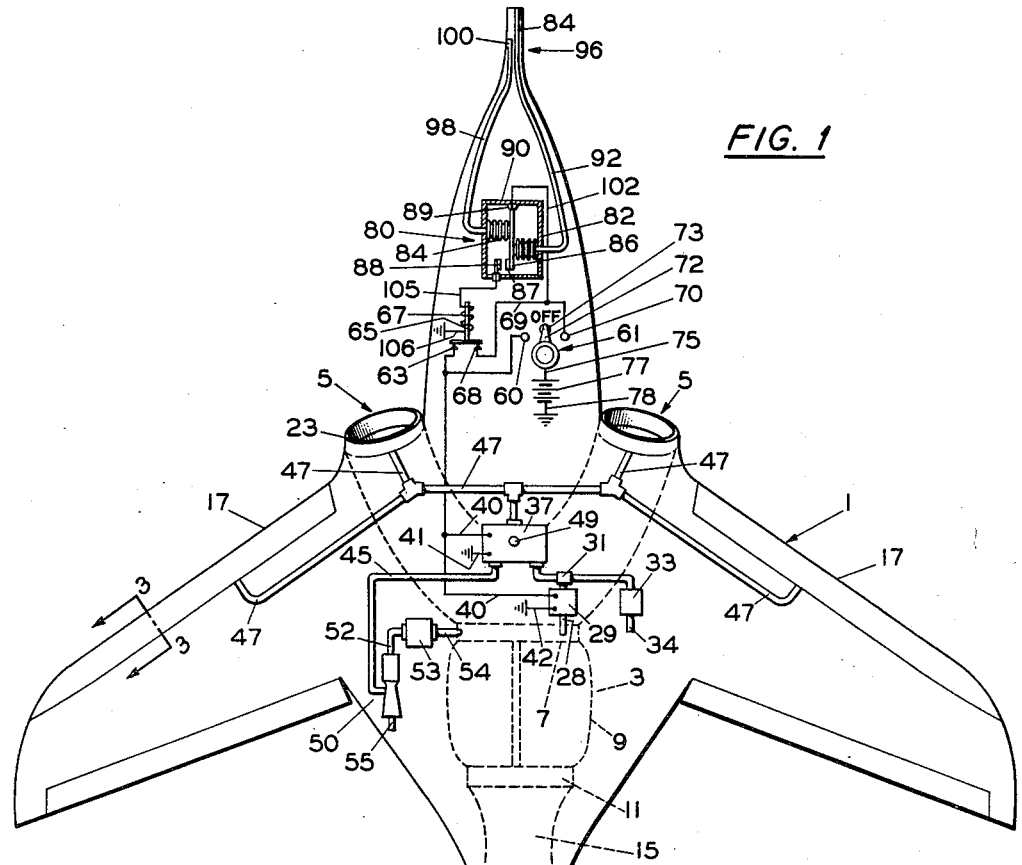
Figure 1 is a plan view of a typical aircraft or missile with which the subject invention is designed for use and showing diagrammatically the manner in which the air outlet pressure from the compressor of a turbo-jet engine is operatively connected into an inflatable shoe or boot control system so as to affect positive and negative operating pressures for such inflatable elements of the system.

Figure 3 is an enlarged fragmentary sectional view taken along the lines 3—3 of Figure 1 and illustrating leading edge of the inflatable element shown in Figure 1. There is illustrated by dotted lines the manner in which the inflatable element may extend the surface of the leading edge of the wing in a blister-like formation and thereby vary the contour of the wing leading edge to effect a desired lift or drag on the aircraft.

Figure 4:
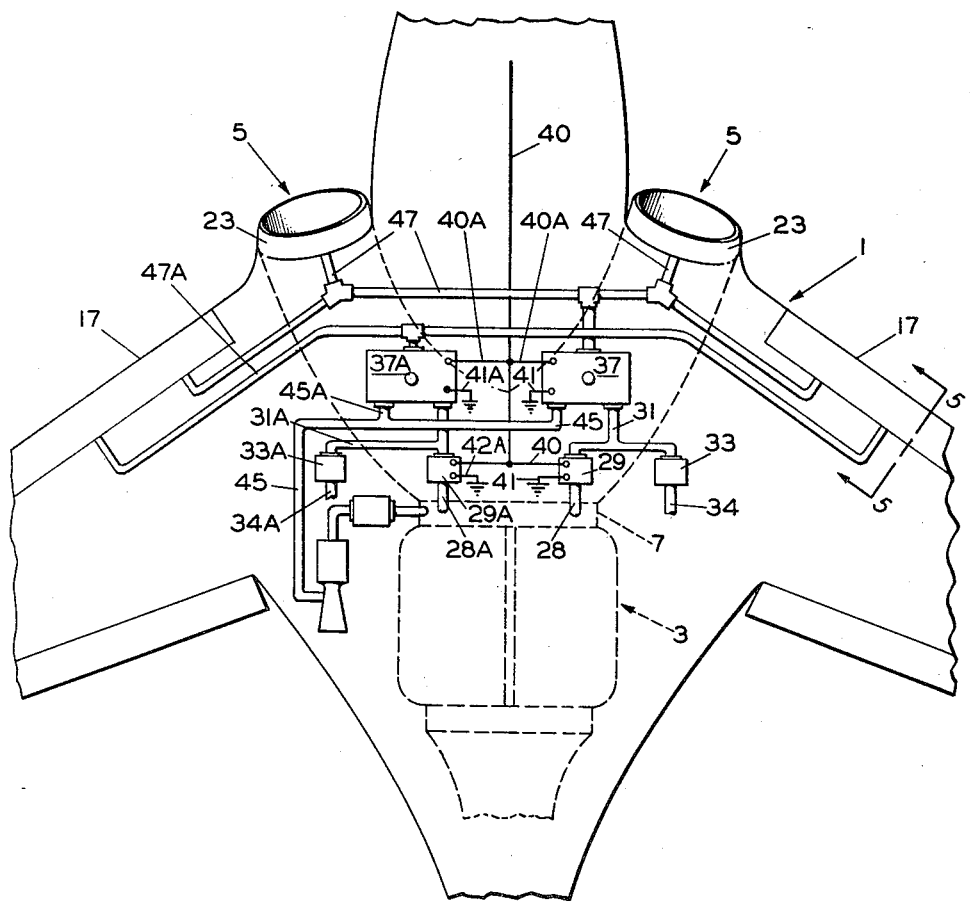

Figure 4 is a fragmentary plan view of an aircraft such as shown in Figure 1 illustrating a modified form of the control system and inflatable boot or shoe elements operated thereby.

Figure 5 is an enlarged fragmentary sectional view taken along the lines 5—5 of Figure 4 and illustrating a modified form of the inflatable element for changing the contour of the leading edge of the wing of the aircraft illustrated in Figure 4, and showing in dotted lines, the manner in which the inflatable element may effect a blister-like formation to vary the contour of the wing leading edge and drag on the aircraft.

Referring to the drawing of Figure 1, there is shown an aircraft or missile indicated by the numeral 1 having a turbo-jet engine shown in dotted lines and indicated by the numeral 3.

The turbo-jet engine may be of the conventional type having ram air inlet ducts 5 leading to a compressor 7 which in turn supplies air under pressure to suitable combustion chambers 9 of the engine 3. The products of combustion from the chambers 9 are directed to a turbine 11 which in turn drives in a conventional manner through a shaft 16, the compressor 7, as shown in dotted lines. The gases from the combustion chamber 9 driving the turbine 11 are exhausted through a conduit 15 in a jet to propel the plane.

Inflatable elements or boots 17 are mounted along the leading edges of the wing of the aircraft, as shown diagrammatically in Figure 1, and may be generally of a type such as disclosed in U.S. Patent No. 2,515,519, granted July 18, 1950, to Donald M. Lawrence et al., and assigned to Bendix Aviation Corporation, except in the present case such boots are specifically designed in accordance with the aerodynamic operating characteristic of the aircraft under consideration and have the primary function of varying the effect of such forces on the wing of the aircraft as distinguished from having the primary function of effecting the removal of ice from the airfoil surface as in the case of the inflatable boots or shoes disclosed in U.S. Patent No. 2,515,519.

Each of the inflatable elements or units 17, as indicated at Figure 3 are constructed of an elastic rubber-like covering 18 suitably reinforced and secured at 19 upon the wing at the near upper side and extending around the leading edge 20 of the wing to the far underside of the wing where the same is suitably reinforced and secured at 21 so that upon inflation of the unit 17 the covering 18 is extended in a blister-like formation on the underside of the wing of the aircraft, and along the leading edge 20 of the wing as indicated by dotted lines in Figure 3, so as to modify the contour of the leading edge of the wing of the aircraft in such a manner that the aerodynamic forces acting thereon provide an extra lift of the aircraft at relatively low operating airspeeds so that the aircraft may take off from the ground at lower speeds and from shorter runways than might otherwise be effected and also providing a desirable drag to permit the aircraft to land on such runways at lesser air speeds than would otherwise be permissible.

In addition, as shown in Figure 1, there are further provided inflatable elements, boots, or units 23 defining the air opening to the inlet ducts 5 leading to the compressor 7 of the engine 3.

Each of the inflatable elements 23 are constructed of an elastic rubber-like covering suitably reinforced and secured about the inlet opening to the air duct 5 so that upon inflation of the elements 23 there is effected a blister-like formation which partially closes the opening defined thereby to the air inlet duct 5 so as to reduce the sharp air inlet to the duct 5 and allow the air to be smoothly directed into the engine for better performance of the aircraft at relatively low air speeds and/or altitude conditions.

At higher speeds and altitudes the inflatable units 23 may be deflated automatically or under control of the operator as hereinafter explained so as to increase the air inlet opening to the duct 5 for better performance of the aircraft under such operating conditions.

There is shown in Figure 1, the control system for operating the inflatable elements, boots or units 17 and 23 in which there is provided a conduit 28 to bleed air under pressure from the outlet of engine compressor 7 through a pressure throttling valve 29 of a conventional type having an on-off control valve operated by a suitable solenoid and leading to a conduit 31 which supplies the air pressure for operation of inflatable elements 17 and 23. The throttling valve 29 serves to maintain the air pressure in the conduit 31 at a predetermined value of, for example, 20 p.s.i.g., a safety valve 33 serves to relieve the conduit 31 into the atmosphere through a conduit 34 should the air pressure in the conduit 31 reach an excessive value of, for example, approximately 22 p.s.i.g., and is used as a safety device only. The pressure conduit 31 leads to a suitable solenoid operated distributor valve 37 which is electrically controlled through conductor 40 and the conductor 41 ground connected to the frame of the aircraft so as to effect inflation and deflation of the inflatable boot elements 17 and 23 as hereinafter explained. The solenoid controlled on-off control valve of the valve mechanism 29 is also electrically controlled by conductor 40 and a conductor 42 ground connected to the frame of the aircraft. Upon energization of the solenoid through conductors 40 and 41 the throttling valve mechanism 29 connects the conduit 28 to conduit 31 and upon deenergization of the solenoid the connection from conduit 28 to conduit 31 through the valve 29 is closed.

The distributor valve 37 is preferably of a type such as disclosed and claimed in the aforenoted U.S. Patent No. 2,515,519. Distributor valve 37 incorporates a pressure inlet port leading from the pressure conduit 31; a suction outlet port connected by a conduit 45 to a suitable source of suction, as explained hereinafter; a distributor port connected by pressure conduit 47 to the respective inflatable elements or boots 17; an exhaust port 49 leading to atmosphere; and suitable mechanism for selectively connecting the pressure conduit 31 and suction conduit 45 to distributor conduit 47, as described in detail in the aforenoted U.S. Patent No. 2,515,519.

Thus in addition to the inflatable elements or boots 17, there are further provided inflatable elements or boots 23, shown schematically in Figure 1, mounted at the inlet ducts 5 so as to change upon inflation and deflation the contour of the inlet ducts 5 leading to the compressor 7 of the aircraft engine 9 so that the air inlet to the engine 3 may be varied to improve the performance of the engine under different air speeds and altitude operating conditions of the aircraft. The distributor valve 37 serves to selectively connect the inflatable units 17 and 23 to negative and positive operating pressures and are therein controlled by energization of electrical conduits 40 and 41. Air under pressure in the boots 17 and 23 upon deenergization of the conduits 40 and 41 may be dumped overboard through operation of the distributor valve 37 by exhausting through the conduit 49 and the suction conduit 45, as explained, in the aforenoted U.S. Patent No. 2,515,519.

The distributor valve 37 is preferably of the type disclosed and claimed in the Lawrence et al U.S. Patent No. 2,515,519 and normally functions so as to cause suction or negative pressure to be applied to the boots 17 and 23 for hold-down during the period when the electrical conductors 40 and 41 are deenergized. However, upon energization of the conductors 40 and 41 and the solenoid in the distributor valve 37, as explained in the aforenoted Patent No. 2,515,519, the solenoid affects movement of a suitable valve mechanism for closing the connection of the conduit 47 leading from the inlet of the boot to the suction conduit 45 and opening the conduit 47 to the pressure conduit 31 thereby allowing the boots 17 and 23 to fully inflate so long as the electrical conductors 40 and 41 and the solenoid in the distributor valve 37 controlled thereby are energized. Upon deenergization as upon opening of the energizing circuit for the electrical conductor 40—41 air under pressure applied to the distributor valve 47 is cut off while opening the conduit 47 to a discharge conduit 49 leading to atmosphere. The air in the inflated boot elements 17 and 23 is then discharged out of such boots through the conduit 47, the distributor valve mechanism 37 and the discharge conduit 49 to the atmosphere, until the pressure in these boots reaches a predetermined value at which time the boot elements 17 and 23 are connected by suitable mechanism in the distributor valve 37 through conduit 47 to the suction conduit 45 whereupon the remaining air is evacuated and the boots 17 and 23 are held down by suction applied through the conduit 45.

A source of suction or negative pressure for the conduit 45 is provided by an air ejector mechanism 50 shown in detail in the copending application Serial No. 321,396 (now U.S. Patent No. 2,753,138) filed November 19, 1952, by Charles H. MacIntyre, and assigned to Bendix Aviation Corporation. The said ejector mechanism 50 has a conduit 52 connected to a pressure throttling valve 53 and through the conduit 54 to the outlet of the engine compressor 7 so as to bleed air from the outlet of the compressor 7 under pressure which flows at high velocity through an ejector mechanism 50 to an outlet conduit 55. The outlet conduit 55 may be exhausted directly to atmosphere or the conduit may be operably connected to suitable air driven instruments of the aircraft requiring a constant flow of air for operation such as an air driven gyro. The throttling valve 53 serves to maintain the air pressure delivered to the air ejector mechanism 50 through conduit 52 at a predetermined value of, for example, 25 p.s.i.g.

As explained in the aforenoted copending application Serial No. 321,396, the air ejector mechanism 50 includes a venturi nozzle having a high pressure side and a low pressure side from which there leads the suction conduit 45. Thus air under pressure of the engine compressor 7 flows through conduit 52, the nozzle of the ejector mechanism 50 and out exhaust conduit 55 of the air ejector mechanism 50 at a high velocity so as to apply a negative pressure through the conduit 45 and distributor valve 37 for exhausting air from the inflatable elements or boots 17 and 23 of the aircraft and holding the same down under suction in the deflated condition during deenergization of the control line 40—41 of the valve mechnism 37 and during which time the control lines 40—42 of the solenoid controlled valve 29 is also deenergized so as to close the line 31 to the pressure conduit 28 leading from the compressor 7.

The control lines, 41 and 42, as shown diagrammatically in Figure 1, are grounded while the electrical conductor line 40 leads to a contact 60 of manually operated control switch 61 and to a contact 63 of a control switch 65 operated by an electrical magnet 67, controlling contacts 63 and 68. The control switch 65 during deenergization of the electro-magnet 67 is biased in a direction to close contacts 63 and 68 and connect the conductor 40 with the contact 68 which in turn is connected through a conductor 69 with contact 70 of the manually operable switch 61. The manually operable switch 61 includes a manual control arm 72 arranged to be adjustably positioned so as to selectively cooperate with contact 60, open contact 73 and the contact 70. The control arm 72 is in turn connected through a conductor 75 to one terminal of a source of electrical energy or battery 77. The opposite terminal of the battery 77 is grounded by a conductor 78 to the frame of the aircraft to which frame the conductor 41 of the solenoid operated control valve mechanism 37 and the conductor 42 of the solenoid operated valve 29 is also grounded.

Thus upon adjustment of the manually operable switch arm 72 so as to close contact 70 energization of the control solenoid in the valve mechanism 37 may be immediately effected through conductor 40 and grounded conductor 41 as well as energization in the control solenoid of the valve 29 through conductor 40 and the grounded conductor 42, during such time as the magnetic winding 67 of the control switch 65 is deenergized. However, upon energization of the magnetic winding 67 of the control switch 65, the switch element 65 is raised so as to open the contacts 63 and 68 effecting deenergization of the respective control solenoids of the valve mechanism 29 and 37 during such time as the manually operable switch arm 72 is adjusted so as to close the contact 70.

*Mach number or air speed responsive control switch*

Control of energization of electromagnetic winding 67 is effected through a Mach number or air speed responsive control switch indicated generally by the numeral 80.

The air speed responsive control switch 80 is shown diagrammatically in Figure 1 and includes bellows 82 and 84 acting differentially on an arm 86 controlling switch contacts 87 mounted at one end thereof and cooperating with a contact 88, whereas the opposite end of the arm 66 is pivoted at 89 in the casing of the control 80.

The interior of the bellows 82 is connected by a tube 92 to an opening 84 subject to dynamic pressure applied through a Pitot tube 96 of conventional type. The interior of the bellows 84 is connected by a tube 98 to opening 100 in the Pitot tube 96 and subject to static or ambient atmospheric pressure.

The arm 86 is connected by an electrical conductor 102 to the contact 70 while the contact 88 cooperating with the movable contact 87 on the arm 86 is connected by a conductor 105 to one terminal of the electromagnetic winding 67 while the opposite terminal of the electromagnetic winding 67 is grounded by a conductor 106 to the frame of the aircraft so that upon contact 87 closing contact 88 the electromagnetic winding 67 may be energized by the battery 77 upon switch arm 72 being adjusted so as to close contact 70. The closing of the contacts 87 and 88 may be effected upon the air speed of the aircraft exceeding a predetermined value, as for example, upon the dynamic pressure acting on bellows 82 so as to cause expansion thereof against the static or ambient atmospheric pressure exerted in bellows 84 causing the arm 86 to close the contacts 87 and 88.

Such energization of electromagnetic winding 67 will in turn cause the switch element 65 to be raised so as to open the contacts 63 and 68 and to cause the deenergization of the respective solenoids controlling the valve mechanism 37 and the throttling valve 29 whereupon air under pressure in the inflatable elements 17 and 23 will be exhausted through port 49 and the elements 17 and 23 in turn held in a deflated condition by suction applied through conduit 45 and the control valve mechanism 37, as heretofore explained.

The energization and deenergization of the respective solenoids controlling the valve mechanism 29 and 37 and inflation and deflation of the boots 17 and 23 may also be effected by manual adjustment of the switch arm 72. Thus upon adjustment of the arm 72 so as to open contact 70 and rest upon the contact 73 thereby cutting out of operation, the heretofore explained automatic Mach number or air speed responsive control, it will be seen that deenergization of the conductor 40 and the respective solenoids controlling the valve mechanism 29 and 37 may be readily effected.

Upon manual adjustment of the switch arm 72 so as to close contact 60 there may be effected energization of the respective solenoids controlling the valve mechanism 29 and 37 and thereby inflation of the elements 17 and 23. In the latter case, deflection of the elements 17 and 23 will not be effected until the manually operable arm is re-adjusted back to the off position in which arm 72 rests upon the open contact 73, as shown in the drawing of Figure 1.

Figure 2:
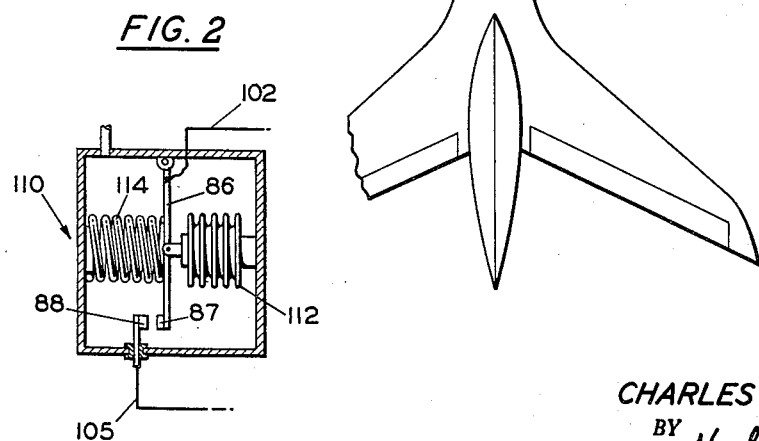
Figure 2 is a detailed sectional view of an altitude switch designed for use in the system of Figure 1 in place of the Mach number or air speed control switch shown therein.

As shown diagrammatically in Figure 2, in which corresponding parts to those of Figure 1 are indicated by like numbers, there may be substituted for the Mach number or air speed responsive control 80 an altitude pressure responsive switch 110 having an evacuated bellows 112 acting on the switch arm 86 against a suitable spring element 114 so as to control the opening and closing of the contacts 87 and 88. Thus upon a decrease in atmospheric pressure, as upon a rise in the prevailing altitude of the aircraft switch arm 86 may cause contact 87 to close contact 88 so as to effect energization of the electromagnetic winding 67 causing the control switch 65 to open contacts 63 and 68 and deenergizing the respective solenoids controlling the valve mechanisms 29 and 37 effecting deflation of boot elements 17 and 23 upon the prevailing altitude of aircraft exceeding a predetermined value.

*Modified form of control system*

In the modified form of control system illustrated in Figure 4 there is provided a control system for controlling the inflation and deflation of a plurality of inflatable elements in the extensible member or boot 17, as shown in Figure 5.

The drawing of Figure 5 illustrates schematically a view taken along the lines of 5—5 of Figure 4 and a modified form of the inflatable element 17 of Figure 3 in which there is included two inflatable portions indicated by the numerals 17 and 17A which are in turn operated by the air pressure in conduits 47 and 47A controlled by valve mechanism 37 and 37A of Figure 4 in which like numerals indicate corresponding parts to those heretofore described with reference to Figure 1 and in which duplicate parts have been indicated by corresponding numerals to which have been added the suffix (A).

The provision of a plurality of inflatable elements 17 and 17A in the boot 17 of Figure 5, serves to more smoothly vary the contour of the leading edge and underside of the wing of the plane by an additional variable surface 18A at the underside and thereby more efficiently utilize the aerodynamic forces acting on the airfoil surfaces of the aircraft.

*Operation*

It will be seen from the foregoing that during flight of the aircraft at a relatively low Mach number or air speed or at a relatively low altitude as sensed by the control switch 80 or switch 110 the inflatable elements 17 and 23 of Figures 1 and 3 or Figures 4 and 5 will be inflated so as to modify the contour of the wing surface and close the opening of the air inlet 5 to the engine 3 causing smoother and better flow of air to the engine at low speeds and altitudes while at the same time providing extra lift to permit take off of the plane at a lower air speed and from a shorter runway.

Also during landing operation the drag on the aircraft after the inflation of the boots 17 and 23 will permit landing of the aircraft at lesser air speeds and on shorter runways. However, upon the aircraft exceeding a predetermined maximum air speed as sensed by the control 80 or upon the aircraft reaching an altitude in excess of the predetermined value as sensed by the control 110 of Figure 2, the elements 17 and 23 will be deflated, as heretofore explained, so that full air flow to the aircraft engine may be effected by deflation of the units 23 and drag on the aircraft effected by the inflated elements 17 and 23 is removed and the elements 17 and 23 are deflated and held in a deflated condition by a suction force applied through the conduit 47 controlled by the control valve mechanism 37, as heretofore explained. However, upon the speed of the aircraft decreasing or the plane resuming a lower altitude of flight within the predetermined value determined by the setting of the air speed control switch 80 or the altitude pressure sensitive mechanism 110, it will be seen that elements 17 and 23 will be once again inflated.

The foregoing will be effected upon the manually operable control switch 61 being adjusted so that the arm 72 closes the contact 70. However, manual operation of the inflatable elements 16 and 23 without automatic control may be effected by moving the manual control arm 72 to the off position in which the arm 72 closes contact 73 and in which position the inflatable elements 17 and 23 are held in a deflated condition. Should it be desired to manually control the inflation of these elements this may be readily effected by adjustment of the control arm 72 so as to close contact 60 whereupon energization of the solenoid operating the valve mechanism 37 is directly effected and inflation of the boots 17 and 23 will result and be maintained in the inflated condition until such time as the operator desires to move the arm out of contacting relation with the contact 60 and to the off position in which the arm 72 closes contact 73, as shown in Figure 1.

Such manual control of the inflation of the elements 17 and 23 provides convenient means for braking the plane in flight so as to permit relatively sharp turns to be made or to permit the plane to be retarded in flight for any other desirable purpose.

Although several embodiments of the invention have been illustrated and described in detail, it is expressly understood that the invention is not limited thereto. Various changes can be made in the design and arrangement of the parts without departing from the spirit and scope of the invention as the same will now be understood by those skilled in the art.

What is claimed is:

1. In an aircraft having a combustion engine and a variable ram air inlet opening to said engine, the combination comprising an extensible surface means defining said variable air inlet opening, means for varying the configuration of said surface means to change the contour of said air inlet opening and thereby vary flow of air to the engine, means responsive to change in the prevailing altitude of the aircraft, said last mentioned means to control said surface configuration varying means so as to extend said surface means to decrease the variable ram air inlet opening and the flow of air to the engine during flight of the aircraft at relatively low altitudes and so as to retract said surface means to increase the variable ram air inlet opening and the flow of air to the engine during flight of the aircraft at relatively high altitudes.

2. In an aircraft having a combustion engine and a variable ram air inlet opening to said engine, the combination comprising an extensible leading edge surface, an extensible surface defining said variable air inlet opening, first means for varying the configuration of the leading edge surface, second means for varying the configuration of the surface defining said air inlet so as to vary flow of air to said engine through said ram air inlet, aircraft flight condition responsive means, means operatively connecting said condition responsive means to said first and second configuration varying means for controlling the leading edge surface and the surface defining said air inlet opening so as to jointly vary aerodynamic characteristics of the aircraft and flow of air to the engine in accordance with the flight condition of the aircraft.

3. In an aircraft having a combustion engine and a variable ram air inlet opening to said engine, the combination comprising an extensible leading edge surface, an extensible surface defining said variable air inlet opening, first means for varying the configuration of the leading edge surface, second means for varying the configuration of the surface defining said air inlet so as to vary flow of air to the engine through said inlet, aircraft flight condition responsive means, means operatively connecting said condition responsive means to said first and second configuration varying means for controlling the leading edge surface and the surface defining said air inlet opening in accordance with the flight condition of the aircraft, said aircraft flight condition responsive means including an atmospheric pressure responsive means effective through said operative connecting means to cause said first and second configuration varying means to extend the leading edge surface and the surface defining said ram air inlet opening during flight of the aircraft at relatively low altitudes so as to jointly retard flight of the aircraft and flow of air to the engine, and said atmospheric pressure responsive means effective through said operative connecting means to cause said first and second configuration varying means to retract the leading edge surface and the surface defining said ram air inlet during flight of the aircraft at relatively high altitudes so as to jointly decrease the retarding effect of said surfaces on the flight of the aircraft and increase flow of air to the engine at said relatively high altitudes.

4. In an aircraft having a combustion engine and a variable ram air inlet opening to said engine, the combination comprising an extensible leading edge surface, an extensible surface defining said variable air inlet opening, first means for varying the configuration of the leading edge surface, second means for varying the configuration of the surface defining said air inlet, aircraft flight condition responsive means, means operatively connecting said condition responsive means to said first and second configuration varying means for controlling the leading edge surface and the surface defining said air inlet opening in accordance with the flight condition of the aircraft, said aircraft flight condition responsive means including means responsive to change in the prevailing altitude of the aircraft effective through said operative connecting means to cause said first and second configuration varying means to extend the leading edge surface and the surface defining said ram air inlet opening during flight of the aircraft at relatively low altitudes and cause said first and second configuration varying means to retract the leading edge surface and the surface defining said ram air inlet during flight of the aircraft at relatively high altitudes so as to jointly vary aerodynamic characteristics of the aircraft and flow of air to said engine in accordance with the prevailing altitude of flight of the aircraft.

5. In an aircraft having a combustion engine and a variable ram air inlet opening to said engine, the combination comprising an extensible leading edge surface, an extensible surface defining said variable air inlet opening, first means for varying the configuration of the leading edge surface, second means for varying the configuration of the surface defining said air inlet and thereby the flow of air to the engine through said inlet, aircraft flight condition responsive means, means operatively connecting said condition responsive means to said first and second configuration varying means for controlling the leading edge surface and the surface defining said air inlet opening in accordance with the flight condition of the aircraft, said aircraft flight condition responsive means including air speed responsive means effective through said operative connecting means to cause said first and second configuration varying means to extend the leading edge surface and the surface defining said air inlet opening during flight of the aircraft at relatively low air speeds so as to jointly retard flight of the aircraft and flow of air to the engine, and said airspeed responsive means effective through said operative connecting means to cause said first and second configuration varying means to retract the leading edge surface and the surface at said air inlet during flight of the aircraft at relatively high air speeds so as to jointly decrease the retarding effect of said surfaces on the flight of the aircraft and increase flow of air through said ram air inlet to the engine at said relatively high air speeds.

6. In an aircraft having a combustion engine and a ram air inlet opening to said engine; the combination comprising means to vary said air inlet opening, operating means for said air inlet opening varying means, and atmospheric pressure responsive means for controlling said operating means so as to increase said ram air inlet opening and flow of air to said engine upon flight of the aircraft at ambient atmospheric pressures within a predetermined minimum range and decrease said air inlet opening and flow of air to said engine upon flight of the aircraft at ambient atmospheric pressures in excess of said minimum range.

7. In an aircraft, the combination with a wing surface having a leading edge, of an inflatable membrane element for extending said wing surface in a blister-like formation along the leading edge thereof, pneumatic operating means for inflating and deflating said inflatable membrane element, said operating means being arranged to hold down said element when contracted by negative pressure action, aircraft speed responsive means operable at a predetermined aircraft speed, manually operable electric switch means, first electric means controlled by said manually operable means for selectively connecting said speed responsive means to said operating means for automatically fully inflating said inflatable membrane element below said predetermined speed, second electric means controlled by said manually operable means in one sense for selectively actuating said operating means so as to cause said element to extend fully said wing surface in said blister-like formation, and said second means controlled by said manually operable means in another sense for selectively actuating said operating means so as to cause said element to contract fully said blister-like formation to a normal wing surface.

8. In an aircraft, the combination with a wing surface having a leading edge, of an inflatable membrane element for extending said wing surface in a blister-like formation along the leading edge thereof, pneumatic operating means including solenoid valve for inflating and deflating said inflatable membrane element, said operating means including a source of pressure gas and an ejector connected to said source, air speed responsive means operable at a predetermined air speed, manually operable electric switch means, first electric means controlled by said manually operable means for selectively connecting said air speed responsive means to said solenoid valve of said operating means for automatically controlling said inflatable membrane element so as to effect the full extension of said wing surface in said blister-like formation at below said predetermined air speed of the aircraft and full contraction of said blister-like formation to a normal wing surface upon flight of the aircraft at air speeds in excess of said predetermined air speed, second electric means controlled by said manually operable means in one sense for selectively actuating said solenoid valve of said operating means so as to cause said element to extend fully said wing surface in said blister-like formation, said second means controlled by said manually operable means in another sense for selectively actuating said solenoid valve of said operating means so as to cause said element to contract fully said blister-like formation to a normal wing surface, and said operating means being arranged to hold down said contracted element by the negative pressure of said ejector.

9. In an aircraft, a wing having inflatable boots along the leading edge, said boots being inflatable to form a depending blister-like formation, inflating conduit means including a solenoid valve connecting a source of pressurized gas to said boots, exhausting means for said boots connected to said valve and including a conduit having an ejector, said ejector being connected to said gas source to provide a negative pressure, said solenoid valve being constructed when energized to permit full inflation of said boots and when de-energized to connect said boots to said exhausting means, electric means to energize said solenoid valve, air speed responsive means operable at a predetermined speed of said aircraft due to the differential between static and dynamic pressures and electrically arranged in said electric means to de-energize automatically said solenoid valve at said speed so that said exhausting means is connected to said boots and said boots are fully deflated and are held down by the suction of said ejector, said electric means including a manual switch having an off position, an automatic position, and manual position, said switch when in said automatic position connecting said air speed means in said electric means for automatic control, a by-pass electric circuit completed by said switch when in said manual position and arranged to by-pass said air speed responsive means and to energize said solenoid valve so that said boots are fully inflated when said manual switch is in manual position, and said off position of said manual switch providing means for fully deflating said boots by de-energizing said solenoid valve.

References Cited in the file of this patent

UNITED STATES PATENTS

| | | |
|---|---|---|
| 2,026,728 | Barnhart | Jan. 7, 1936 |
| 2,306,759 | Sears | Dec. 29, 1942 |
| 2,350,751 | Gliubich | June 6, 1944 |
| 2,378,528 | Arsandaux | June 19, 1945 |
| 2,596,435 | Robert | May 13, 1952 |
| 2,705,863 | Clark et al. | Apr. 12, 1955 |

FOREIGN PATENTS

| | | |
|---|---|---|
| 607,686 | Great Britain | Sept. 3, 1948 |
| 840,312 | France | Jan. 11, 1939 |